UNITED STATES PATENT OFFICE.

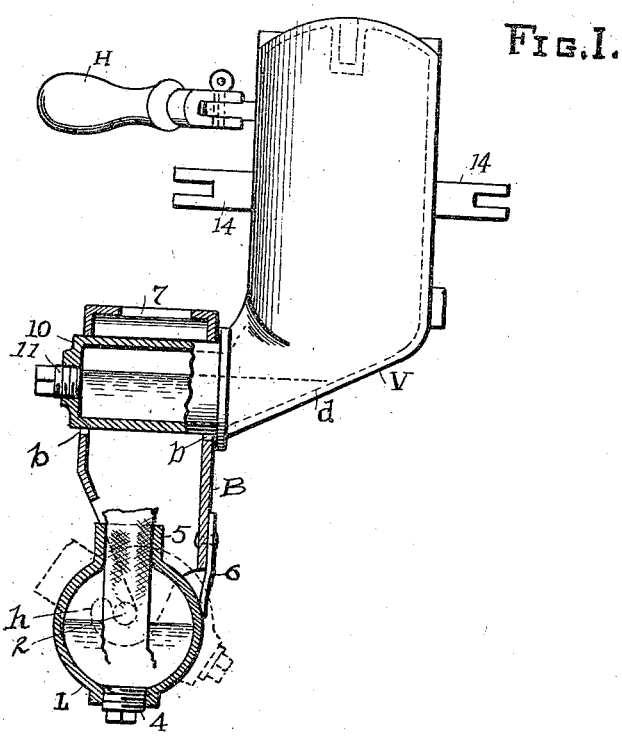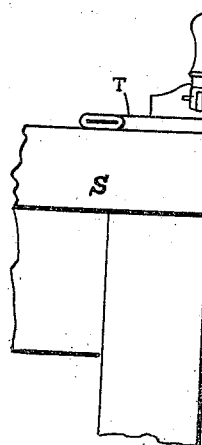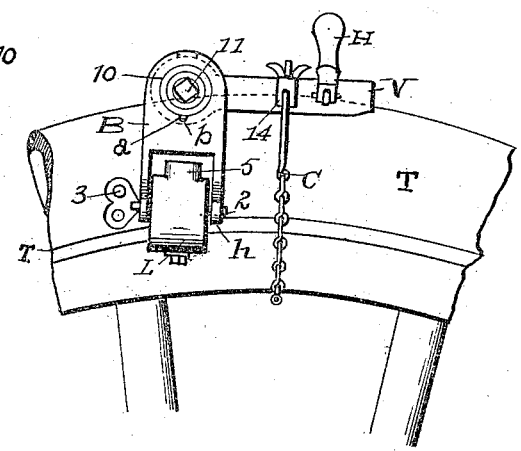

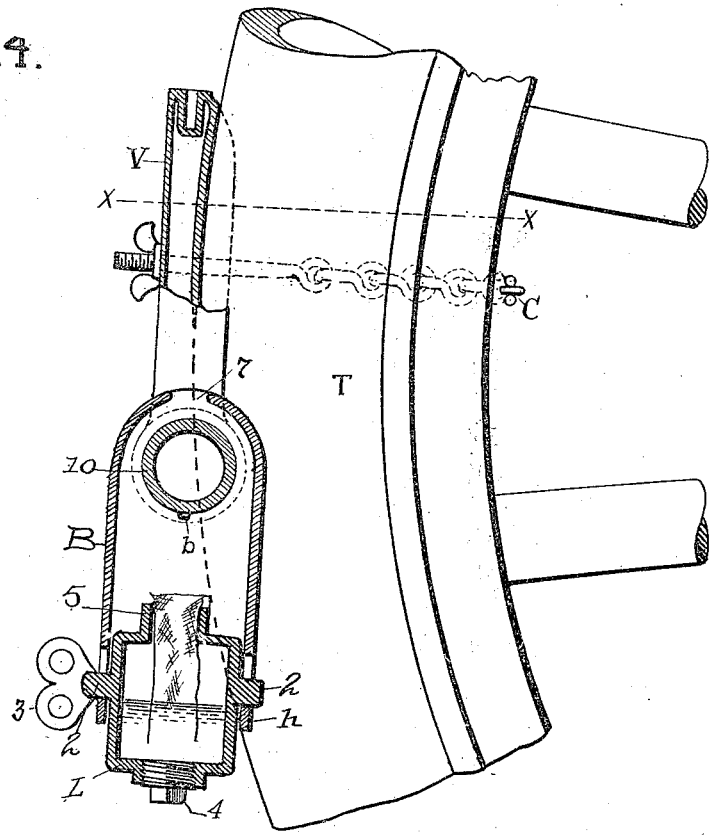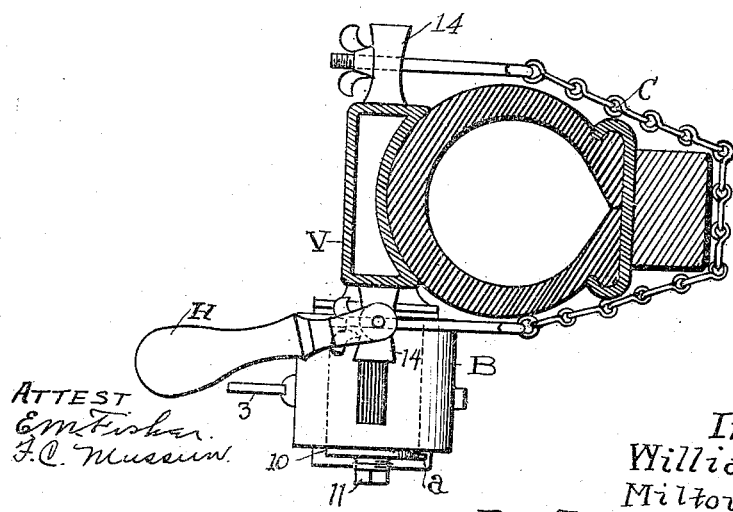

WILLIAM C. RISBRIDGER AND MILTON W. RISBRIDGER, OF CLEVELAND, OHIO, ASSIGNORS TO WILLIAM TROSTLER AND SAMUEL I. ROSE, BOTH OF CLEVELAND, OHIO.

VULCANIZING DEVICE FOR RUBBER TIRES.

997,853. Specification of Letters Patent. Patented July 11, 1911.

Application filed November 14, 1910. Serial No. 592,281.

*To all whom it may concern:*

Be it known that we, WILLIAM C. RISBRIDGER and MILTON W. RISBRIDGER, citizens of the United States, residing at Cleveland, in the county of Cuyahoga and State of Ohio, have invented certain new and useful Improvements in Vulcanizing Devices for Rubber Tires, of which the following is a specification.

This invention relates to a vulcanizing device for rubber tires, and the invention consists in the construction and combination of parts substantially as shown and described and particularly pointed out in the claims.

In the accompanying drawings, Figure 1 is a side elevation of the tire partially sectioned in its lower portion. Fig. 2 is an elevation of the device shown in connection with a table and a tire flattened out thereon in vulcanizing position. Fig. 3 shows a section of a wheel and tire thereon with the device in vulcanizing position thereon reverse to Fig. 2. Fig. 4 shows an enlarged section of wheel and tire and the vulcanizer suspended thereon with the parts in vertical alinement in side view, and Fig. 5 is a cross section on line $x$—$x$, Fig. 4, showing especially the relation of the parts to each other and to the wheel when in this vulcanizing position.

As thus shown the complete device is comprised in three associated parts specifically referred to herein as the body B, the vulcanizer or vulcanizing member V and the lamp L. Of course the device as a whole is a vulcanizer, so-called, but in this instance this designation is given to the part V particularly for convenience of description and designation. The part B constitutes the body proper of the device and serves as a support for both the other parts, and together said parts constitute a steam heated vulcanizer of original and novel structural characteristics and having special advantages in use, as we believe, and hereinafter fully set forth. Thus, the said body B is a hollow shell or member shaped preferably as shown and having an open bottom and depending hooks $h$ or their equivalent at its sides adapted to serve as a support for the burner of lamp L. In construction and preferably the said lamp or burner is barrel shaped with flat ends and has trunnions 2 eccentrically disposed in said ends and adapted to be hung upon the said hooks $h$. By placing said trunnions relatively above the center of said barrel the barrel holds its working position by gravity in any and all the relations of the same to the body B and whatever the vulcanizing positions, as seen in Figs. 2 to 4 inclusive. For convenience one of said trunnions has a key shaped wing 3 adapted to be grasped by thumb and finger to handle the lamp. At its bottom said lamp or barrel has a plugged opening 4 through which it is filled and at its top it has a circular opening and projection 5 adapted to receive a wick for ignition to maintain the desired flame. In this instance we also provide a flat spring 6 depending from the rear wall of body B and bearing frictionally against said barrel and serving to prevent easy rocking of said barrel from its proper position beneath the body B, as hereinafter fully set forth.

At its top the body B has a suitable opening 7 and opposite circular openings in its front and rear wall adapted to receive the tubular hub 10 of the vulcanizing member V. Said hub is cylindrical in shape and has a hole and plug 11 in its end through which water is introduced for the vulcanizer, the said hub being cast integral with the body of the vulcanizer V and open thereto interiorly. The vulcanizer itself is a hollow member adapted to receive steam at a vulcanizing temperature, and for this purpose the hub 10 is essentially the boiler for said member.

In construction the whole part V necessarily includes the hub or boiler 10 but is peculiar and original in this that said hub is at one end and entirely at the side of the body of the vulcanizer, so that when the hub is inserted in the body member B and locked to work therein the body of the vulcanizer is wholly at one side of and apart from body B and in a plane of its own. This is material on several accounts, as is obvious, and chiefly for its advantageous working disposition to the said body B. Thus, take Fig. 2 for example, where the tire T is flattened out on a table or stand S and the flat side of the vulcanizer is applied to the tire while the body B and its lamp in upright position swing at the side of the table. Or, refer to Fig. 3, where tire T is on the wheel in distended form and the vulcanizer is thrown with its concave side lengthwise upon the tire in line with the periphery of the wheel. Here again body B is in swinging or suspended relation bodily at one side of the vulcanizer and lamp L hangs normal. Like relations and advantages are shown in the other two working positions, Figs. 4 and 5, Fig. 4 being a side view and Fig. 5 a plan view which necessarily conceals the lamp beneath the visible body B.

It thus appears that there is not only a pivotal relation between the two working parts B and V but that by reason of said parts sustaining this relation in wholly separate parallel planes the vulcanizer can be turned to any desired working position on its pivot and the lamp and body will still hold their intentional and only working position as shown. The vulcanizer therefore has what are believed to be wholly original and exceptional possibilities as differentiated from the single and only working position of body B and lamp L and all by reason of its being pivoted in said body as shown and adapted to swing about the same in almost a complete circle and stop at any point in the circle for work. The said vulcanizer V is provided with open slotted projections 14 oppositely at its edges adapted to receive a supporting chain C, not new, and a handle H is pivotally supported on one edge of said vulcanizer and adapted to throw the same to one position or another in use.

The hub or boiler 10 of the vulcanizer has a small lug $a$ on its edge and end adapted to be rotated around and pass through notches $b$ in the shell when the said hub is to be withdrawn or inserted. Otherwise the said lug is sufficient to confine the hub in working position. This or any other means may be employed to hold said parts separably together. By locating said hub or tubular stem 10 as shown and described it really comes at the lower end of the vulcanizer and hence it will follow that when said hub is charged with water the water will generally remain therein where it is designed to be heated, though of course some will flow into the shank or arm $d$ which connects said hub with the body of the vulcanizer.

Rubber tubes generally as well as pneumatic tires may be mended by this device although it is especially intended for automobile tires.

The draft from the heater or lamp L is up through body B and the products of combustion pass about the sides of hub or stem 10 and heat the same before issuing through hole 7 at the top.

The lamp or heater L is rotatably supported on its bearings and engaged and held by spring 6 for the express purpose of holding said lamp in working position with the flame wholly inside or wholly outside, as seen in full and dotted lines respectively in Fig. 1, or the flame may be divided, say half inside and half out according to the demands of the vulcanizer. When the requisite steam heat has been obtained in the vulcanizer the lamp will maintain the same by throwing the flame more or less outside, and the front of casing or shell B is shaped at its front to permit this movement.

What we claim is:

1. A vulcanizing device having a hollow body and a hollow vulcanizing member provided with a tubular lateral extension at its edge and end rotatably mounted in said body and adapted to receive water to steam heat said member, and a heating attachment at the bottom of said body.

2. A device as described having a hollow supporting member provided with circular openings through the side walls thereof and openings in bottom and top and a vulcanizer having a hollow body and a tubular stem at its end and side rotatably mounted in said side walls open to said body.

3. A device for vulcanizing tubular tires and like articles comprising a hollow body having openings bottom and top, in combination with a vulcanizer constructed to be steam heated internally and having a hollow hub at its edge adapted to receive water and rotatably mounted in openings in the side walls of said body, and a burner beneath said body adapted to heat said hub and thereby fill said vulcanizer with steam.

4. The device substantially as described comprising two working members, a hollow body with a draft upward through the same and a vulcanizer having a water containing stem projecting at substantially right angles from its edge and rotatably mounted in said hollow body, and a heating device suspended beneath said body.

5. A vulcanizing device having a hollow body with a draft through the same bottom to top and having depending hooks, a heater suspended on said hooks and a vulcanizer supported wholly at one side of said body and pivotally mounted through the sides thereof, said vulcanizer having a hollow portion in said pivot open to the interior thereof and adapted to receive water to be heated.

6. A vulcanizing device having a hollow body open through its center for draft and a heater in its bottom, in combination with a vulcanizer having a lateral hub pivotally mounted in the top of said body and open to said hub, said hub provided with a plugged opening to introduce water, and means to separably confine said parts together in working relation.

7. A vulcanizing device having a body with an internal heating chamber and a vulcanizing member having a water receiving extension at its side rotatably mounted in said chamber and exposed to the heat therein.

8. A vulcanizing device comprising a hollow vulcanizing body and a heating body pivotally united, said vulcanizing body having a laterally projecting tubular stem pivoted in said heating body and open to the interior thereof, and said vulcanizing body adapted to swing in the arc of a circle to either side of said heating body.

9. A vulcanizing device comprising a hollow vulcanizing member having flat and concave sides respectively and provided with a tubular fluid heating stem projecting laterally from its end, in combination with a heater having said stem rotatably mounted therein and exposed to the heat in said chamber.

In testimony whereof we affix our signatures in presence of two witnesses.

WILLIAM C. RISBRIDGER.
MILTON W. RISBRIDGER.

Witnesses:
R. B. MOSER,
E. M. FISHER.